United States Patent
Marshall et al.

(10) Patent No.: US 7,857,484 B2
(45) Date of Patent: Dec. 28, 2010

(54) LIGHTING PANELS INCLUDING EMBEDDED ILLUMINATION DEVICES AND METHODS OF MAKING SUCH PANELS

(75) Inventors: Joseph A. Marshall, Lake Forest Park, WA (US); Gregory W. Nelson, Everett, WA (US); Bradley J. Mitchell, Snohomish, WA (US); Brock J. Prince, Seattle, WA (US)

(73) Assignee: The Boeing Company, Chicago, IL (US)

( * ) Notice: Subject to any disclaimer, the term of this patent is extended or adjusted under 35 U.S.C. 154(b) by 196 days.

(21) Appl. No.: 12/054,837

(22) Filed: Mar. 25, 2008

(65) Prior Publication Data

US 2009/0059610 A1    Mar. 5, 2009

Related U.S. Application Data

(63) Continuation-in-part of application No. 11/848,467, filed on Aug. 31, 2007.

(51) Int. Cl.
*F21S 4/00* (2006.01)
*F21S 8/02* (2006.01)
*G09F 13/08* (2006.01)

(52) U.S. Cl. .................. 362/249.14; 362/249.01; 362/249.06; 40/550; 40/553; 40/579; 40/580

(58) Field of Classification Search ........... 362/249.01, 362/249.02, 249.06, 249.14, 249.16, 800, 362/806, 807; 40/550, 553, 579, 580
See application file for complete search history.

(56) References Cited

U.S. PATENT DOCUMENTS

| | | | |
|---|---|---|---|
| 4,164,008 A * | 8/1979 | Miller et al. | 362/103 |
| 4,345,308 A * | 8/1982 | Mouyard et al. | 362/332 |
| 4,953,066 A * | 8/1990 | Schiffer | 362/236 |
| 4,967,317 A * | 10/1990 | Plumly | 362/613 |
| 5,416,678 A * | 5/1995 | Schabowski | 362/249.14 |
| 5,424,924 A * | 6/1995 | Ewing et al. | 362/545 |
| 5,519,595 A * | 5/1996 | Wang | 362/234 |
| 5,557,150 A | 9/1996 | Variot et al. | |
| 6,059,423 A * | 5/2000 | Knopick | 362/156 |
| 6,203,180 B1 * | 3/2001 | Fleischmann | 362/471 |
| 6,540,373 B2 * | 4/2003 | Bailey | 362/150 |
| 6,718,576 B1 | 4/2004 | Shih | |
| 6,764,196 B2 | 7/2004 | Bailey | |
| 6,817,123 B2 * | 11/2004 | Okazaki et al. | 40/452 |
| 6,914,267 B2 | 7/2005 | Fukasawa et al. | |

(Continued)

FOREIGN PATENT DOCUMENTS

DE    198 11 076    9/1999

(Continued)

*Primary Examiner*—Ismael Negron
(74) *Attorney, Agent, or Firm*—Haynes & Boone, LLP

(57) ABSTRACT

A lighting panel includes a structural panel, a plurality of inserts containing microminiature light sources, such as LEDs, mounted in openings in the panel or in an appliqué applied thereto, a plurality of electrically conductive traces written on the upper surface of the panel so as to make electrical interconnections with respective leads of the light sources, and a decorative film applied over a bottom surface of the panel and the light sources, the decorative film being translucent or transparent or containing a plurality of apertures therethrough, each corresponding in location to a respective one of the light sources.

23 Claims, 8 Drawing Sheets

U.S. PATENT DOCUMENTS

| | | |
|---|---|---|
| 7,055,987 B2 | 6/2006 | Staufert |
| 7,204,622 B2 | 4/2007 | Dowling et al. |
| 7,443,678 B2 | 10/2008 | Han et al. |
| 7,559,673 B2 * | 7/2009 | Meersman et al. .......... 362/245 |
| 2004/0121326 A1 | 6/2004 | Harari et al. |
| 2005/0007791 A1 * | 1/2005 | Helbach et al. ............. 362/555 |
| 2007/0247842 A1 | 10/2007 | Zampini et al. |
| 2008/0225553 A1 | 9/2008 | Roberts et al. |

FOREIGN PATENT DOCUMENTS

| | | |
|---|---|---|
| EP | 1 495 910 | 12/2005 |
| GB | 2 211 681 A | 7/1989 |
| WO | WO 2004/102064 | 11/2004 |

* cited by examiner

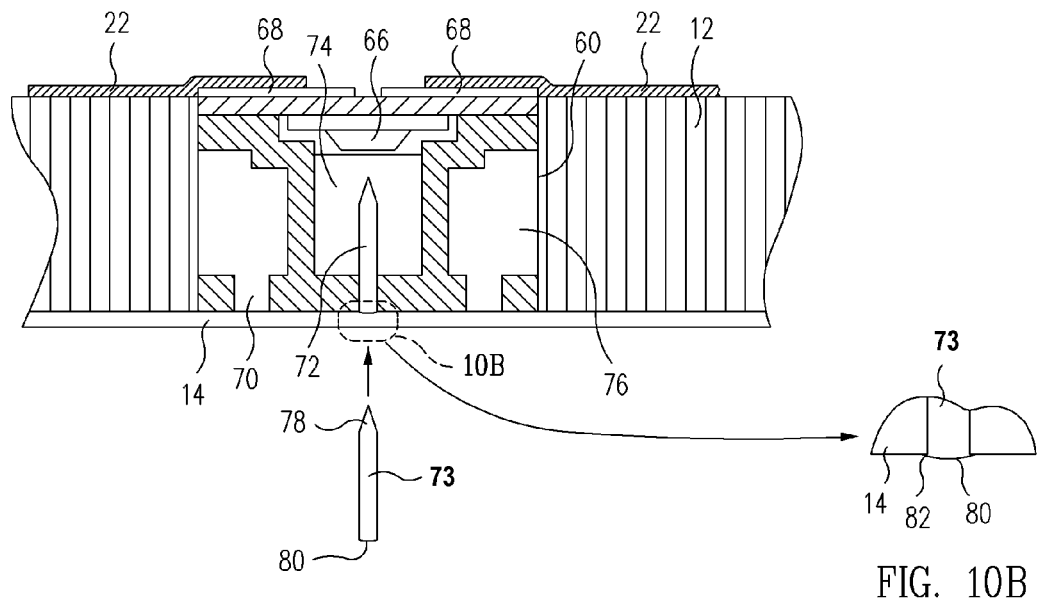
FIG. 10A
FIG. 10B
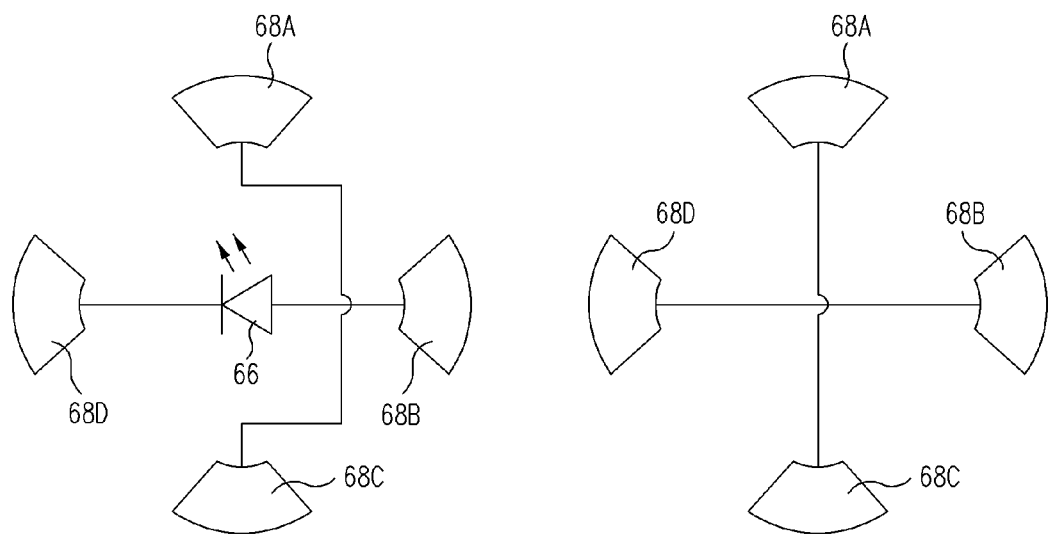
FIG. 11
FIG. 12

LIGHTING PANELS INCLUDING EMBEDDED ILLUMINATION DEVICES AND METHODS OF MAKING SUCH PANELS

RELATED APPLICATIONS

This is a continuation-in-part of U.S. patent application Ser. No. 11/848,467, filed Aug. 31, 2007, the entire disclosure of which is incorporated herein by reference.

BACKGROUND

This disclosure relates to interior lighting panels for passenger aircraft, in general, and in particular, to an improved aircraft ceiling mounted lighting panel adapted to display a starry nighttime sky effect.

Passenger aircraft that operate over long distances during the night typically include interior lighting arrangements that provide substantially reduced ambient light so that passengers can sleep comfortably, but which is still bright enough to enable those passengers who choose not to sleep to move about the cabin safely. For example, as illustrated in FIG. 1, some models of current passenger jets incorporate ceiling panels 100 that incorporate light emitting diodes (LEDs) that are arranged so as to blink in random patterns against a gray or dark blue background, and which, in a reduced ambient light condition, gives the relaxing, soporific appearance of a starry nighttime sky, and hence, is referred to as a "Starry Sky" ceiling lighting arrangement.

FIG. 2 illustrates a conventional Starry Sky lighting panel 100 swung down along a long edge thereof to expose the complex discrete wiring and electrical components located on the back surface thereof. The existing arrangement uses Diehl Aerospace lenses, lens holders, hardwired LEDs, wire bundles deployed on individual standoffs, and discrete power conditioning and control components that are integrated with each other in a relatively complex manufacturing process to produce a panel that gives the desired lighting effect. In a typical installation, the aircraft may contain about 70 such panels 100, each of which may be about 4-6 ft. long, 2-3 ft. wide, and contain about 70 or more LEDs.

The disadvantages and limitations of this prior art solution are that the method of producing the panels is costly, the resulting panels are relatively heavy, require intensive, ergonomically costly manual labor steps, take up a relatively large volume behind the ceiling panels and are difficult to retrofit into existing aircraft.

In light of the foregoing, there is a need in the relevant industry for an aircraft ceiling lighting panel that provides a Starry Sky effect through a "solid state" implementation that does not use Diehl lenses, lens holders, wired LEDs and complex associated point-to-point wiring, that reduces panel weight, volume, manual fabrication and assembly labor and cost, eliminates repetitive injuries, and that can easily be retrofitted into existing aircraft.

BRIEF SUMMARY

In accordance with the exemplary embodiments disclosed herein, aircraft ceiling lighting panels and methods for manufacturing them are provided that produce a starry nighttime sky effect by means of an arrangement that does not use Diehl lenses, lens holders, wired LEDs and associated point-to-point wiring, thereby reducing panel weight, volume, manual fabrication and assembly labor, repetitive injuries, and providing lighting panels that are more easily retrofitted to existing aircraft.

In one embodiment, a lighting panel comprises a structural panel having opposite first and second surfaces and a plurality of openings therethrough. Each of a plurality of inserts, containing a respective light source, is disposed in a respective one of the panel openings. A plurality of electrically conductive traces is directly formed on the first surface of the panel so as to make electrical interconnections with respective leads of each of the light sources, and a decorative film is disposed over the second surface of the panel, the film being either transparent, translucent, or containing a plurality of apertures therethrough, each corresponding in location to a respective one of the light sources.

In another embodiment, the inserts may respectively comprise a housing having opposite first and second ends. The first end has an opening adapted to receive the respective light source, and the second end has an opening defining a light path of the light source. The housing is affixed within the respective panel opening such that the first end is disposed below the first surface of the panel and the second end is disposed generally flush with the second surface thereof. An assembly of a PCB and the light source is affixed to the first end of the housing. The assembly comprises a PCB having opposite first and second sides. The first side of the PCB is disposed generally flush with the first surface of the panel and has a first pair of electrically conductive pads disposed thereon, each electrically coupled with a respective end of a first one of the conductive traces. The light source is mounted to the second side of the PCB. The light source has leads electrically connected to respective ones of the conductive pads through the PCB and a lens directed toward the light path of the housing.

In yet another embodiment, the inserts may respectively comprise a housing having opposite first and second ends. The first end includes an opening adapted to receive the respective light source and the second end has an opening defining a light path of the light source. The housing is affixed within the respective panel opening such that the first end is disposed generally flush with the first surface of the panel and the second end is disposed generally flush with the second surface thereof. A light source, PCB and protective cover assembly is affixed to the first end of the housing. The assembly comprises a protective cover having opposite first and second sides. The first side of the cover may have a feature adapted to be engaged by fingers or a tool, and the second side has features adapted to engage corresponding complementary features at the first end of the housing in a mechanical coupling engagement. The assembly further comprises a PCB having opposite first and second sides and a first pair of spring-loaded electrical contacts protruding downwardly from the second side thereof, each contact being disposed in electrical contact with a respective end of a first one of the conductive traces. The light source is mounted on the second side of the PCB. The light source has leads electrically connected to respective ones of the spring-loaded contacts through the PCB and a lens directed toward the light path of the housing.

A better understanding of the above and many other features and advantages of the Starry Sky ceiling panels of the present disclosure, together with the advantageous methods disclosed herein for making them, can be obtained from a consideration of the detailed description of some exemplary embodiments thereof below, particular if such consideration is made in conjunction with the appended drawings, wherein like reference numbers are used to refer to like elements in the respective figures thereof.

BRIEF DESCRIPTION OF THE DRAWINGS

FIG. 10A is a partial cross-sectional view through a vehicle interior lighting panel having the exemplary LED panel insert of FIG. 9A installed therein;

FIG. 10B is a partial enlarged detail view of the area of FIG. 10A enclosed within the area 10B, showing details of a transparent lens installed therein;

FIG. 11 is partially schematic diagram of an LED panel insert containing an LED and illustrating an exemplary arrangement for enabling the crossing of circuit traces over the insert;

FIG. 12 is partially schematic diagram of an exemplary panel insert arrangement for enabling the crossing of circuit traces over the insert in the absence of an LED;

DETAILED DESCRIPTION

This disclosure relates to improved "Starry Sky" aircraft ceiling lighting panel systems and methods for manufacturing them. The novel lighting panels comprise a plurality of small light sources, viz., microminiature light emitting diodes (LEDs), or alternatively, organic light emitting diodes (OLEDs), together with control circuitry interconnected with conductive traces that are printed or otherwise formed directly onto an aircraft structural ceiling panel and/or to a lamination of flexible substrates that are then bonded to such a structural ceiling panel in the form of an appliqué therefor. The result is a Starry Sky lighting panel construction that is lighter, smaller, less expensive, and easier to retrofit to existing aircraft than existing Starry Sky lighting panel systems.

The novel panels achieve the foregoing advantages in large part by moving the discrete wiring of the prior art panels, such as that illustrated in FIG. 2, from the back of the panel to a circuit board style conductive wiring trace, or pattern, that is formed directly on the face of the substrate and/or structural panel through a "direct write" manufacturing method described below. Surface mount micro LEDs or OLEDs are then covered by clear and/or decorative laminates ("declams") comprising thin, flexible films, such as Du Pont Tedlar polyvinyl fluoride (PVC). In one embodiment, the declam is provided with small apertures, or "vias" through which the light sources are respectively exposed.

Figure 2:
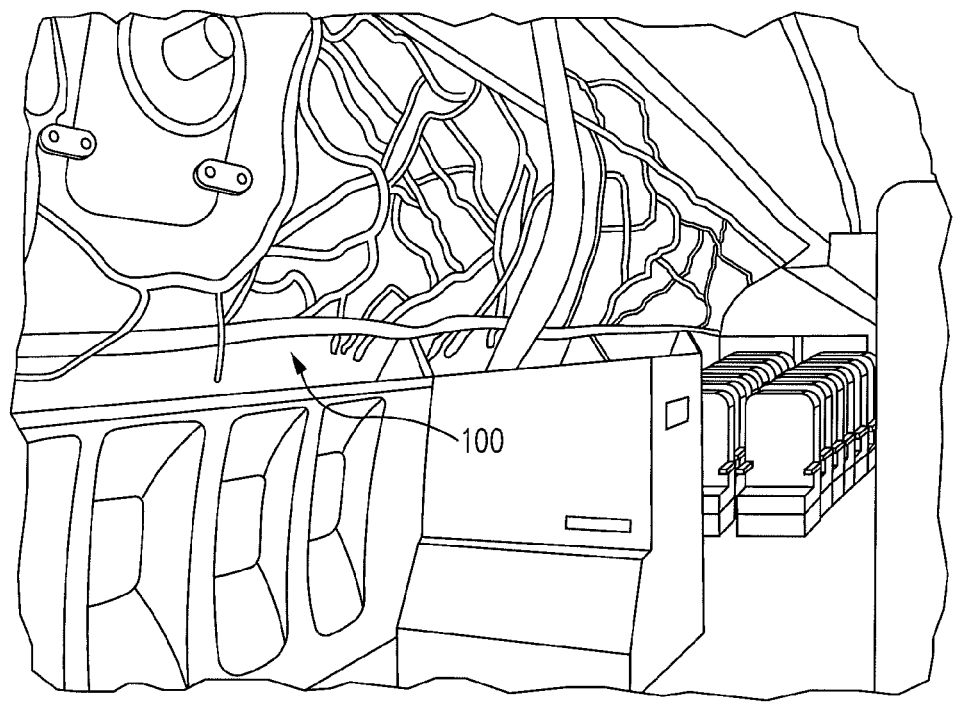
FIG. 2 is a perspective view of the prior art Starry Sky lighting panel of FIG. 1, shown swung down along a long edge thereof to expose the associated wiring and electrical power and control components disposed on the back surface thereof.

As may be seen by reference to FIG. 2, the prior art lighting panel 100 has all of the components installed on the back, or non-decorative surface of the panel. The method by which the holes are made for the light sources (LEDs) to shine through is a high ergonomic risk process. By contrast, some of the panels of the present disclosure have most of the components disposed on the front, or decorative surface of the panel, and covered by a decorative laminate, such that only the wire bundle connection, and in one possible embodiment, a small microprocessor control chip, are located on the non-decorative surface. In these embodiments, the bulky, complex wiring on the back side of the panel is thus eliminated or greatly reduced, thereby reducing the weight and volume of the panel.

Figure 3A:
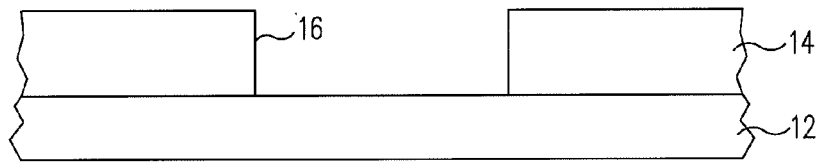
FIGS. 3A-3F are partial cross-sectional views of an exemplary embodiment of a Starry Sky aircraft ceiling lighting panel or appliqué therefor in accordance with the present disclosure, showing sequential processes of an exemplary embodiment of a method for manufacturing the panel.

FIGS. 3A-3F are partial cross-sectional views of one exemplary embodiment of a Starry Sky aircraft ceiling lighting panel 10 in accordance with the present disclosure, showing sequential processes involved in an exemplary method for manufacturing the panel. As illustrated in FIG. 3A, lower and upper flexible base substrates 12 and 14 are provided, the upper one having small perforations or through-openings 16 formed at each desired LED location 16 in the panel. In one embodiment, the two base substrates 12 and 14 may each comprise a polyvinyl fluoride (PVF) material, such as Tedlar film, made by Du Pont. Of course, other strong, flexible dielectric substrate materials may also be employed for these substrates, e.g., Kapton or Mylar. Additionally, in an appropriate case, the lowermost base substrate 12 may comprise an existing aircraft structural ceiling panel, made of, e.g., a polycarbonate or polyurethane plastic, with the lighting laminations described below being built up on a downward facing, or decorative surface thereof. The openings 16 in the upper base substrate 14 may be formed in a variety of ways, for example, by laser ablation.

Figure 3B:
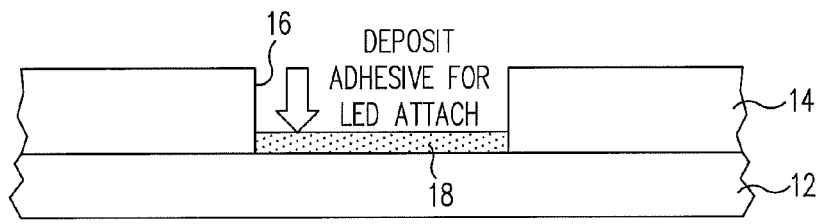
Figure 3C:
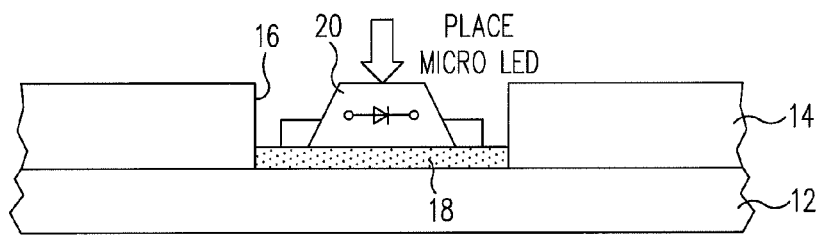

As illustrated in FIG. 3A, the upper base substrate 14 containing the openings 16 is bonded or laminated to an upper surface of the lower base substrate 12 so as to form a plurality of recesses with closed bottoms. As illustrated in FIG. 3B, an adhesive 18 is then placed at the bottom of each opening. Then, as illustrated in FIG. 3C, a microminiature light source, e.g., an LED 20, is placed onto the adhesive in each of the openings, for example, using a conventional pick-and-place machine (not illustrated).

Figure 3D:
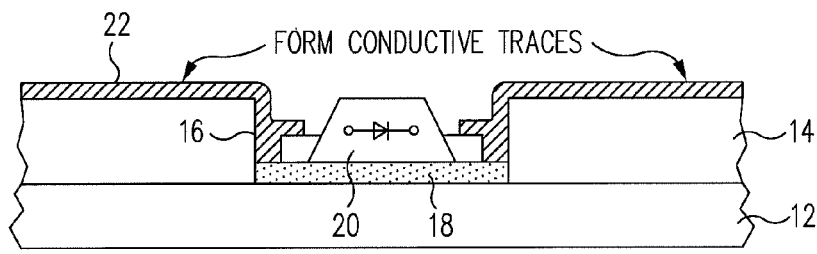

As illustrated in FIG. 3D, electrically conductive circuit traces 22 are then "written" over the top surface of the upper substrate 14 so as to make electrical connections with the respective leads, i.e., the anode and cathode, of each of the LEDs 20. As discussed below, the conductive traces 22 electrically interconnect the LEDs 20 with the power and control circuitry of the panel 10 such that each LED can be controlled independently of the others, i.e., caused to blink or "twinkle." Alternatively, groups of associated LEDs in the panel can be controlled independently of each other.

In an alternative embodiment (not illustrated), the light sources 20 can be mounted on the upper surface of the lower substrate 12 and then interconnected by writing the conductive traces 22 over the top surface of the lower substrate 12 before the upper substrate 14 is bonded thereto. The upper substrate can then be laminated over the lower substrate, the conductive traces and the light sources, such that each light source is received in a respective opening 16 of the upper substrate.

Figure 3E:
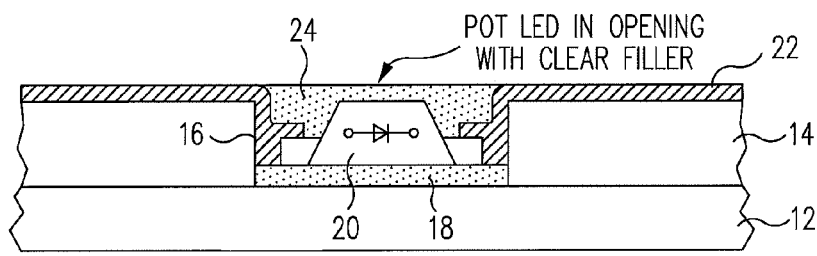

As illustrated in FIG. 3E, each LED 20 is potted in its respective opening 16 by depositing a clear "potting" or filler material 24 around the LED so as to fill any gaps around the LED and thereby "planarize" it, i.e., provide a relatively smooth upper surface on the laminate in the area of the LED. The resulting substrate-LED assembly may then be cured, e.g., by UV radiation, if UV curing adhesives are used, or alternatively, may be co-cured with an underlying aircraft structural ceiling panel 12 with heat, e.g., in a crush core or autoclave process.

Figure 3F:
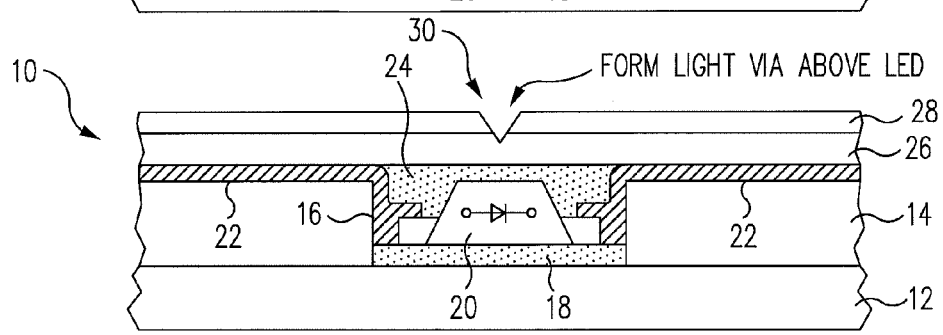

As illustrated in FIG. 3F, a clear film or lamination 26, e.g., Tedlar or the like, is then installed over the laminate, followed by a final decorative film or lamination (declam) 28 having a desired color and/or decorative pattern. Small apertures or vias 30 are then cut through the decorative Tedlar film or lamination 28 to provide a light emitting opening at each micro LED 20. As discussed above, the resulting laminate may then be bonded to the lower or decorative side of a rigid aircraft structural ceiling panel (not illustrated) in the form of an appliqué, or alternatively, as described below, if the lower base substrate 12 comprises such a rigid or structural panel, the lighting panel is substantially complete. As those of skill in the art will appreciate, the latter embodiment, i.e., one in which the upper flexible substrates or laminations 14, 26 and 28 are built up directly on an existing rigid substrate, such as an aircraft structural ceiling panel 12, is effective in minimizing weight, by virtue of the elimination of the need for a lower flexible or base substrate 12 as described above.

As those of skill in the art will also appreciate, there are numerous other fabrication and assembly options available that will arrive at the same or a substantially similar lighting panel 10 configurations. For example, the flexible upper substrate 14 may include a "flap" (not illustrated) located at an edge of the panel 10, upon which terminal ends of the circuit traces 22 are written, and that is arranged to wrap around the edge of the panel to the back side thereof so as to provide a location thereat for the installation of the power and control electronics of the panel. This "wraparound" circuit board may then be populated by either bonding the electronic components to the substrate and then writing interconnecting conductive traces 16 upon their respective leads, or by printing the circuit traces onto the upper substrate 14 and then attaching the electronics thereto using, e.g., conductive adhesives. It should also be noted that the direct-write manufacturing techniques contemplated herein and described below are also capable of printing many of the necessary passive electronic power and control components themselves, such as resistors, capacitors, antennas, ground planes, EMI shielding, and the like, thereby minimizing the number of discrete components utilized in the lighting panel 10.

Figure 4:
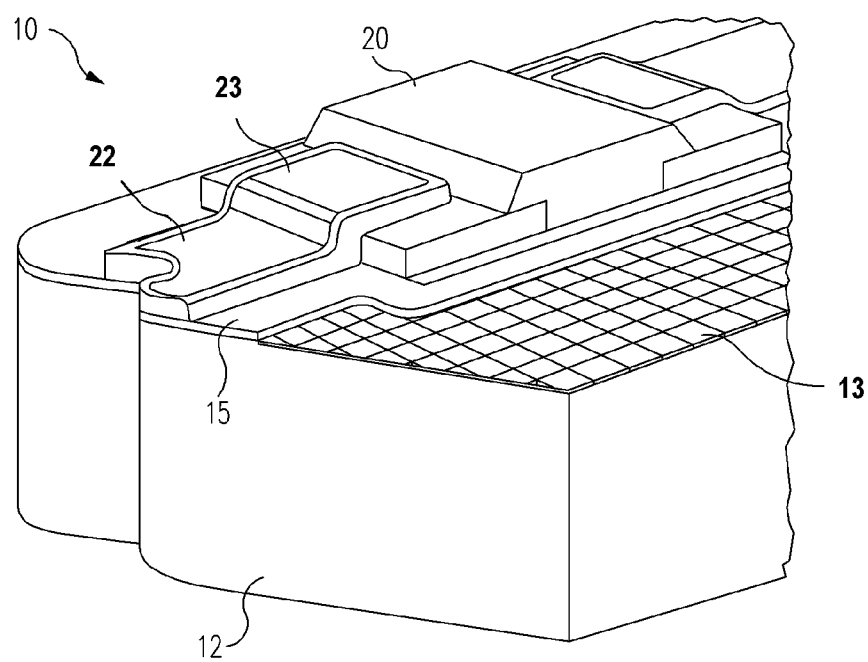
FIG. 4 is a partial cross-sectional perspective view of a single, surface-mounted and electrically interconnected microminiature LED of another embodiment of an aircraft ceiling lighting panel in accordance with the present disclosure.

FIG. 4 illustrates another exemplary embodiment of a lighting panel 10 comprising a lamination buildup made directly on the decorative side of a rigid lower substrate, e.g., a honeycomb-structure aircraft structural ceiling panel 12. In this embodiment, the lower or decorative side of the panel comprises a carbon fiber composite skin 13. Since the carbon fiber material is electrically conductive, one or more dielectric films 15 are first printed over the composite skin 13 of the panel in those regions that will later have conductive elements, e.g., conductive traces 22 and electrical components, such as microminiature LEDs 20, attached thereto. It should be noted that this step is only necessary when printing the conductive traces 22 on electrically conductive panels 12, such as those containing metallic or carbon fiber skins 13, and may be omitted where the underlying structural panel 12 is non-conductive.

A plurality of tiny light sources, e.g., microminiature LEDs 20, are then bonded to the upper surface of the structural panel 12, and conductive traces 22 are then written on the upper surface of the structural panel 12 so as to form electrical interconnections 23 with the leads of the LEDs 20. At this point, a potting or filler material 24 (not shown in FIG. 4) may be dispensed around the periphery of each LED 20 so as to taper the high points of the LEDs and conductive traces 22 down to the panel upper surface and thereby planarize it so as to prevent "markoffs," i.e., small discontinuities in the upper surface which are perceived as blemishes, when a decorative film or lamination 28 (not shown in FIG. 4) is then laminated over the panel surface. The final decorative film or lamination 28 (not shown in FIG. 4) is then laminated over the panel surface and the LEDs 20, and small light vias 30 are made therein at locations corresponding to each of the micro LEDs 20, as described above in connection with FIGS. 3A-3F.

Figure 5:
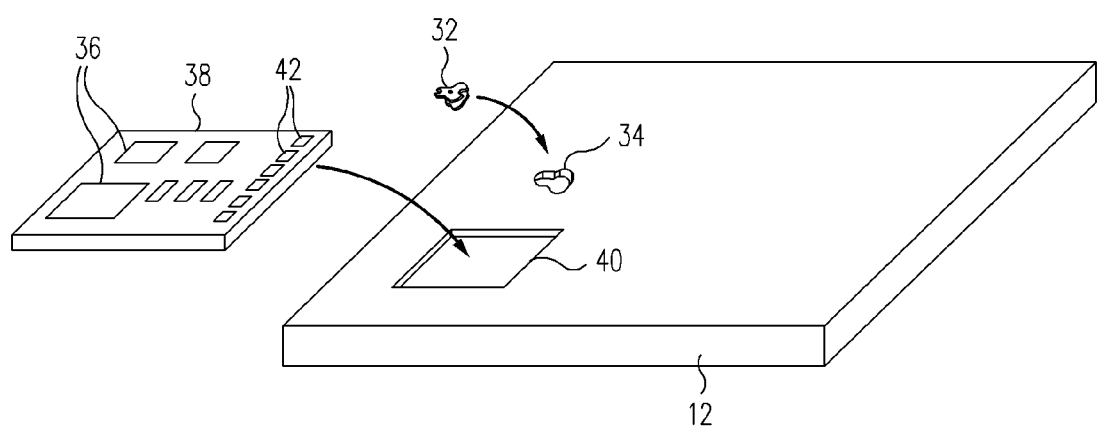
FIG. 5 is a partial perspective view of another exemplary embodiment of a Starry Sky lighting panel, showing an LED insert and a pre-assembled block containing embedded discrete electronic components required for operation of the panel being potted into respective cavities formed in a decorative side of the panel and prior to being written with conductive trace interconnects.
Figure 6:
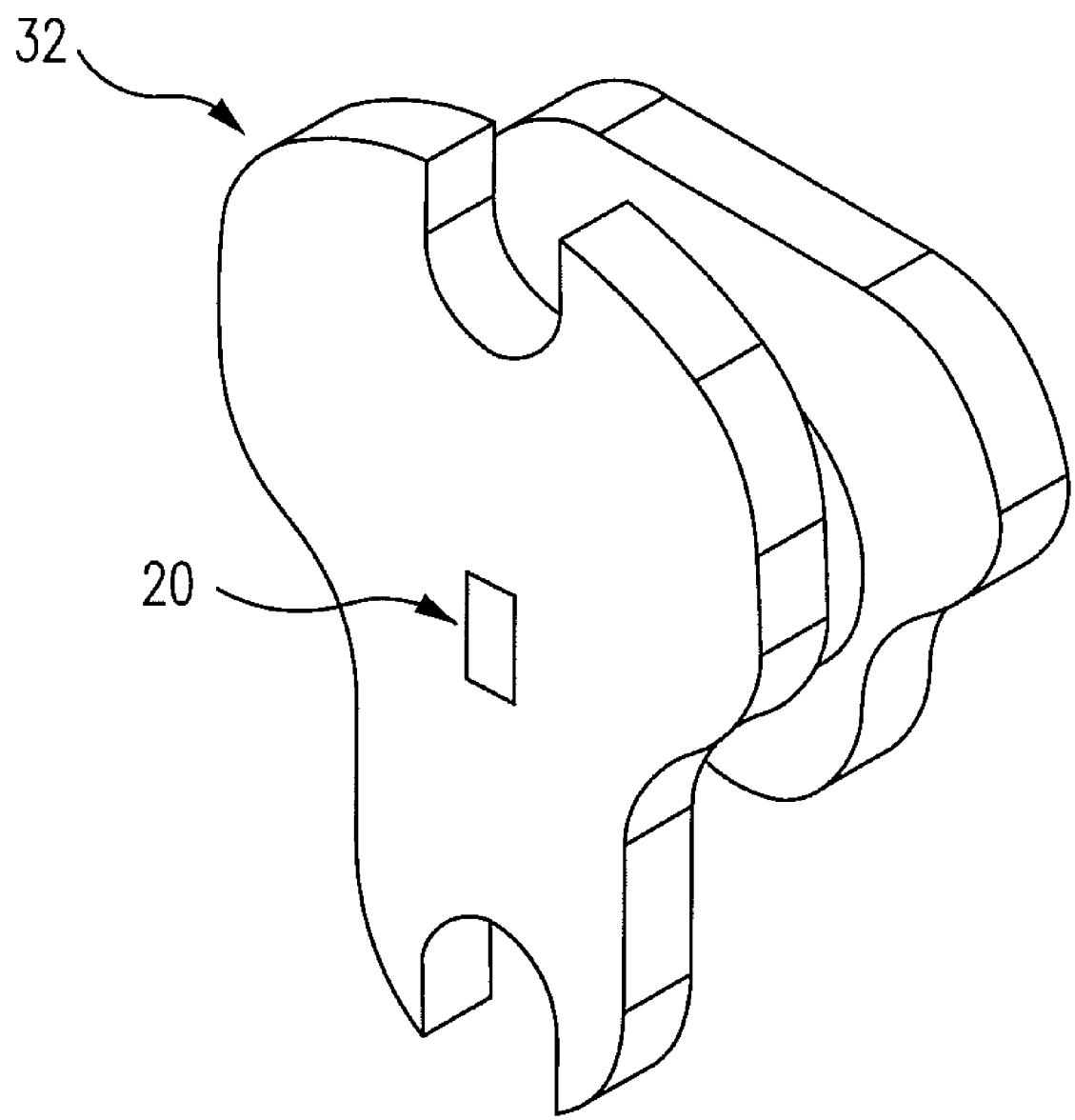
FIG. 6 is a perspective view of a microminiature LED insert of another aircraft ceiling lighting panel in accordance with the present disclosure.

As illustrated in FIG. 5 and described in more detail below, it is possible to eliminate the need for a filler or potting material 24 around the LEDs 20, used to reduce markoffs as described above, by incorporating the LEDs 20 within panel inserts 32 that are respectively bonded into predrilled recesses 34 in the structural panel 12 so as to be flush with the upper surface thereof, and then writing the conductive traces 22 directly on the panel surface so as to electrically interconnect the respective LEDs 20 of the inserts 32. As illustrated in FIG. 6, the inserts 32 may be configured to be non-symmetrical in shape to help ensure correct orientation and electrical polarity of the associated LEDs 20 when installed in the panel 12.

As further illustrated in FIG. 5, in yet another exemplary embodiment, other discrete electrical components 36, e.g., microprocessors and RF control components required to power and control the LEDs 20 of the panel 12, can be embedded into a pre-assembled power and control module 38, which may then be potted into a corresponding cavity 40 formed into the decorative side of the panel 12. The power and control module 38 may incorporate terminal input/output connection or contact pads 42 that enable easy electrical interconnection between the power and control module 38 and the LEDs 20 via the written conductive traces 22.

As in the other embodiments described above, after the conductive trace interconnects 16 have been written between the contact pads 42 of the power and control module 38 and the respective terminals of the LEDs 20, the upper surface of the panel 12, including the power and control module and the LEDs, may then be covered over with a decorative laminate film (not illustrated), with the declam being penetrated with vias at each of the LED locations to form light openings, as described above.

Figure 8:
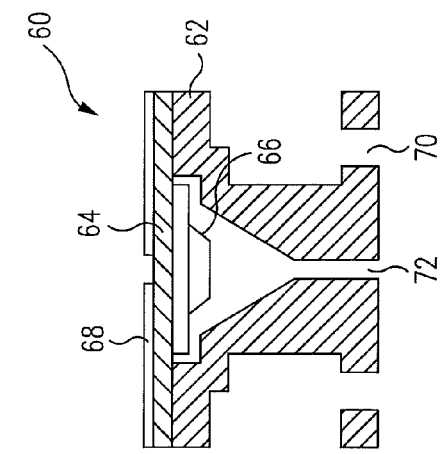
FIG. 8 is a cross-sectional view of the LED panel insert of FIG. 7, as seen along the lines of the section 8-8 taken therein.
Figure 7:
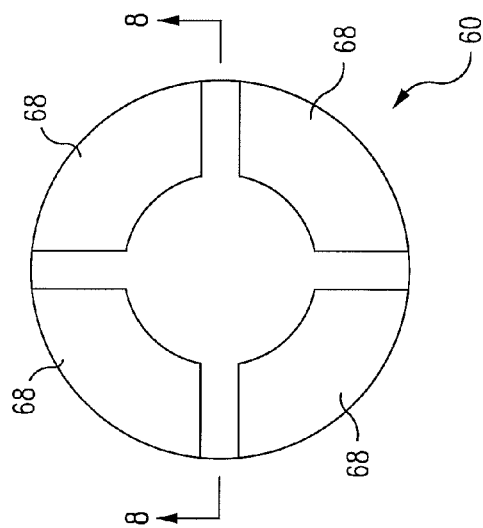
FIG. 7 is a top plan view of another exemplary embodiment of a one-piece, or integrated LED insert for a vehicle interior lighting panel.

FIG. 7 is a top plan view of another exemplary embodiment of a single-piece or "integrated" lighting panel insert 60, comprising a molded opaque housing 62, preferably plastic, and an associated PCB-LED assembly, including a printed circuit board (PCB) 64 mounting a micro-LED 66, and which is affixed within the insert housing, e.g., with an adhesive, to form a single, integrated insert assembly. FIG. 8 is a cross-sectional view of the integrated panel insert 60, as seen along the lines of the section 8-8 taken in FIG. 7. The integrated insert assembly 60 has the advantages of simplicity and lower cost over a multi-part insert, such as the two-part panel insert 84 described below, but, as will be appreciated, after the insert is potted into lighting panel, it becomes a relatively permanent part of the panel, making it more difficult to repair in case of, e.g., failure of the LED 66. However, given the high reliability and long operating life of modern LEDs, particularly when operated in a low-power and/or pulse-width modulated mode, the simplicity afforded by the single-piece panel insert 60 may greatly outweigh this drawback.

As illustrated in the top plan view of FIG. 7, four conductive pads 68 are provided on the upper surface of the insert 60 for making electrical connections thereto. Two of the conductive pads 68 are connected to and used to power the integrated LED 66, as schematically illustrated in FIG. 11. The other two conductive pads are electrically connected to each other through the PCB 64, and are used to provide a mechanism for enabling circuit traces disposed on the upper surface of the lighting panel 12 to cross over each other, which is explained in more detail below.

Figure 9C:
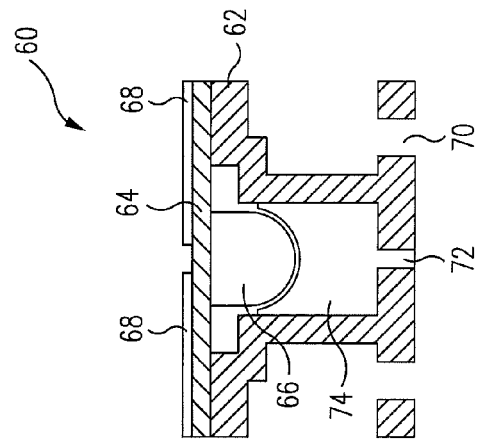
FIGS. 9A-9C are cross-sectional views through the LED panel insert of FIG. 8, respectively showing three possible alternative configurations thereof.
Figure 9B:
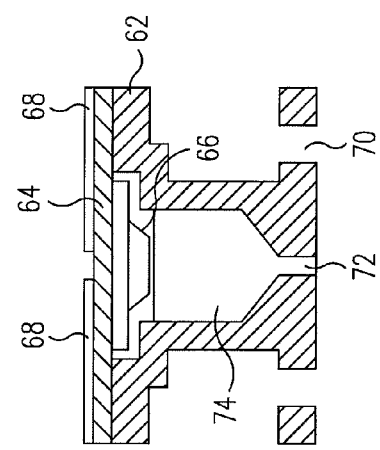
Figure 9A:
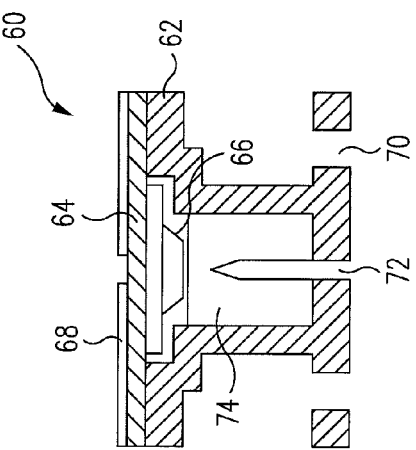

FIGS. 9A-9C are cross-sectional views through the integrated panel insert 60 of FIGS. 7 and 8, respectively showing three possible alternative embodiments thereof. As illustrated in FIGS. 8 and 9A-9C, the PCB 64 with the attached micro LED 66 is assembled onto the upper end of the opaque insert housing 62, with the LED pointing down. The housing may include adhesive fill holes 70 to enable a potting adhesive, e.g., an epoxy, to be injected into the space between the insert housing and a panel (not illustrated) in which the insert is to be mounted. A light path comprising an opening 72 is formed through the insert housing 62 to enable light generated by the micro LED 66 to pass through the insert 60 and out the bottom end thereof, i.e., through the lower, or decorative side of a ceiling panel in which the insert 60 is mounted.

Optionally, a transparent plug 74 may be included within the insert housing 62 to facilitate the conduction of light produced by the micro LED 66 to the bottom end of the insert 60, as illustrated in the embodiments of FIGS. 9A-9C. The transparent plug 74 may fill the entire light path 72 such that it is disposed flush with the bottom end of the insert, as illustrated in the embodiments of FIGS. 9B and 9C, or alternatively, as illustrated in the embodiment of FIG. 9A, may include a hole for receiving a lens (not illustrated), of a type described in more detail below. Additionally, the transparent plug 74 may have a cupped upper end surface to provide better optical coupling with the Micro LED 66, e.g., when a conventional domed-lens LED of the type illustrated in FIG. 9C is used in the insert 60.

As illustrated in FIGS. 9A-9C, there may be instances in which the LED 66 is located in close proximity to a transparent plug 74 in the insert. A fluid, gel or compliant material with an index of refraction similar to the LED lens and the transparent plug may be placed between the LED and the transparent plug to provide better optical coupling between the LED and transparent plug. In the embodiments of FIGS. 9A-9C, this fluid may be an epoxy that also serves to permanently bond the circuit board/LED assembly to the transparent plug and insert housing 62. In the case of a multipart embodiment that can be disassembled after installation, such as the two-piece insert 84 described below, a non-permanent material is indicated.

FIG. 10A is a partial cross-sectional view through an aircraft ceiling structural panel 12 having the exemplary single-piece, or integrated LED panel insert 60 of FIG. 9A installed therein, and FIG. 10B is a partial enlarged detail view of the area of FIG. 10A enclosed in the area 10B, showing details of a transparent lens 73 being inserted therein.

Like the embodiments described above, the panel 12 may comprise a honeycomb core construction having a decorative lamination 14 disposed on its lower surface. Conductive traces 22 are printed on the upper surface of the panel so as to make electrical connection with two of the conductive pads 68 disposed on the upper surface of the insert and respectively connected through the PCB 64 to the cathode and anode of the micro LED 66 mounted thereon. Optionally, a dielectric material, such as a non-conductive epoxy, can be printed, written or sprayed over the conductive traces 22 to protect them from the environment and/or to prevent other objects from making electrical contact with them. The insert 60 may be retained in the panel by an adhesive 76, such as an epoxy, that is injected into the space between the panel and the housing 62 of the insert through the adhesive fill openings 70 at the lower end of the insert, as described above.

As those of skill in this art will appreciate, some aircraft interior surfaces are painted instead of using a decorative laminate (declam) 14 thereon. Paint typically weighs less than an equivalent film laminate but is often more labor intensive to obtain an unblemished surface thereon. Accordingly, a suitable film of paint may be applied, e.g., by a spraying operation, to the decorative surface of the panel 12 in lieu of laminating a preformed declam thereon.

Figure 1:
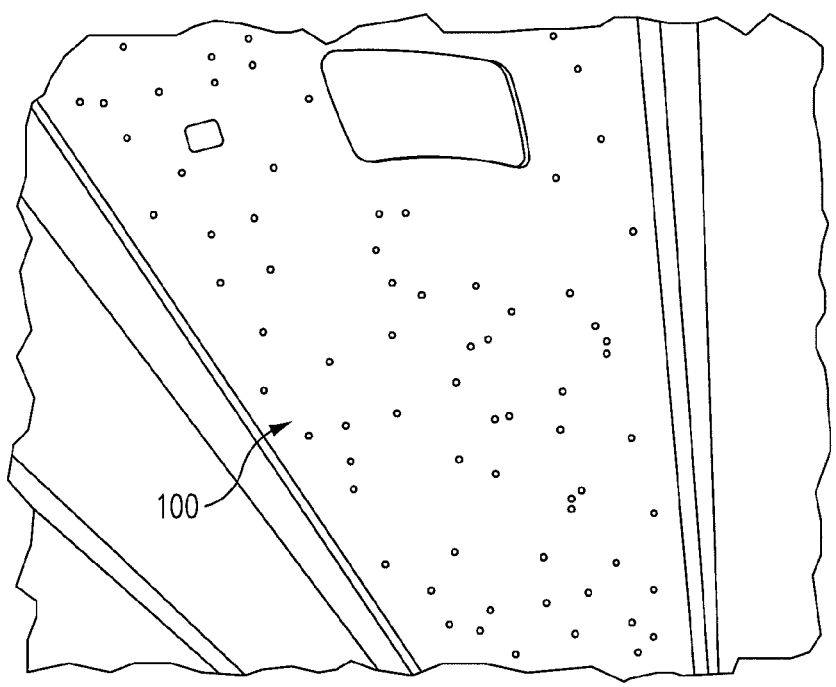
FIG. 1 is a perspective view, looking upward, of a Starry Sky aircraft ceiling lighting panel in accordance with the prior art.

The decorative laminate 14 may be adhered to the lower surface of the panel 12, either before or after printing of the conductive traces 22, thereby covering the previously installed inserts. The light from the LED 66 may then pass through the insert light path 72 and the translucent or transparent decorative laminate to create the star effect. The advantage of this arrangement over the prior art panel of FIG. 1 is that there are no visible unlit "stars" on the decorative side of the panel when the star effect is turned off. This arrangement also disguises failed LEDs when the star effect is turned on but one or more of the LEDs has failed.

Alternatively, an aperture aligned with the light path opening 72 of the insert 60 may be formed through the decorative laminate 14. Such holes may be formed by mechanical drilling, mechanical punching, laser drilling, or a variety of other well known methods. In the particular exemplary embodiment of FIGS. 10A and 10B, an elongated, optically transparent lens 73 is inserted into the light path opening 72 through the aperture in the decorative laminate. The transparent lens 73 may have a sharp end 78 adapted to pierce the decorative laminate at the location of the light path outlet end of the insert, and may be constructed of a material, such as an optical fiber glass or plastic material, having an index of refraction similar to that of an optically transparent plug 74 used within the insert.

The shaft of the transparent lens 73 may have a snap-in feature (not illustrated) to enable it to snap into a corresponding retaining feature in the insert housing 62 or transparent plug 74. The head end 80 of the transparent lens 73 may be roughened to aid in widely scattering or diffusing the transmitted light, which is desirable to enable the star effect to be seen from all angles from below. Further, the head end 80 of the lens 73 may have a small flange 82 formed around its edge to aid in capturing the edges of the hole formed in the decorative laminate 14.

In lieu of a transparent plug 74, the insert 60 may be pre-loaded with a transparent gel, fluid, epoxy or silastic material, e.g., silicon rubber, having an index of refraction similar to that of the lens of the LED 66 to improve optical coupling with the LED, or such material may be injected into the insert, for example, with a syringe, after it is installed in the panel 12. In the event that the decorative side of the panel 10 is covered with a paint in lieu of a decorative laminate 14, a temporary plug may be inserted into the light path opening 72 to prevent the paint from entering the light path opening during the painting process. After painting, the temporary plug may be removed to reveal an open light path opening 72 to allow later installation of the transparent lens 73.

As described above, two of the conductive pads 68 on the rear side of the PCB 64 are used for making electrical connection with the associated LED 66 when the insert 60 is assembled in a lighting panel assembly. These conductive pads are preferably configured so as to occupy as much of the outer diameter of the back side of the circuit board as possible so as to produce the largest possible interconnect periphery and thereby provide the largest possible tolerance for the conductive traces 22 printed later on the back side of the panel 12, as described in more detail below.

As those of skill in the art will appreciate, printing multiple electrical circuits on the back surface of a panel creates a certain challenge, in that these circuits will in most instances need to physically cross each other without making an electrical connection, i.e., a short circuit, at the point of their crossing. As illustrated in FIGS. 11 and 12, a mechanism for doing this is provided by the second set of pads 68A and 68C on the PCB 64 of each panel insert 60, which are electrically connected to each other through the PCB.

Thus, each panel insert 60 may serve as both a "star" and a circuit crossing location. Additionally, "dummy" panel inserts (i.e., inserts without LEDs) can also be confected that provide only circuit crossing locations. These two configurations are respectively illustrated schematically in FIGS. 11 and 12. In FIG. 11, the ends of a first conductive trace (not illustrated) are respectively connected to the pads 68B and 68D to convey electrical power to the LED 66, while the second set of interconnected pads 68A and 68C enable a second trace (not illustrated) having ends respectively connected thereto to cross over or under the first trace without creating short circuit between the two traces. In FIG. 12, the LED 66 is omitted, and both the first and second sets of pads 68B and 68D are respectively connected to each other to enable two orthogonally crossing traces to cross each other without creating a short circuit.

It should be noted that, in addition to the above crossing arrangements, conductive traces on a panel may also be successfully crossed by first printing one conductive trace, then printing a dielectric "patch" over a portion of the first conductive trace at the desired crossing location, and then printing a second conductive trace over the dielectric patch. This method is made feasible by the fact that modern direct write techniques enable printing of both conductive and dielectric materials (such as a UV cured epoxy). However, this method requires additional processing steps (as opposed to simply including a crossing trace capability on the conventionally manufactured PCB 64 of each insert. Thus, in FIGS. 11 and 12, the crossover pads 68A and 68C and the PCB trace interconnecting them can be omitted, and in their place, a layer of a dielectric material can be written over the upper surface of the PCB so as to cover LED connecting pads 68B and 68D and the trace interconnecting them. This, in turn, enables a second conductive trace to be written over a first trace connected to the LED without short circuiting to it.

Figure 13:
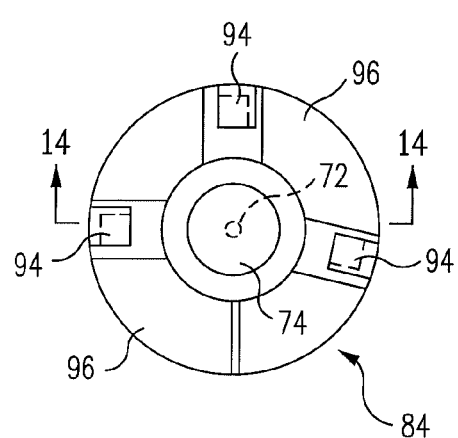
FIG. 13 is a top plan view of another exemplary embodiment of a LED insert for a vehicle interior lighting panel, wherein an associated LED-mounting PCB and protective cover thereof is omitted for clarity.
Figure 14:
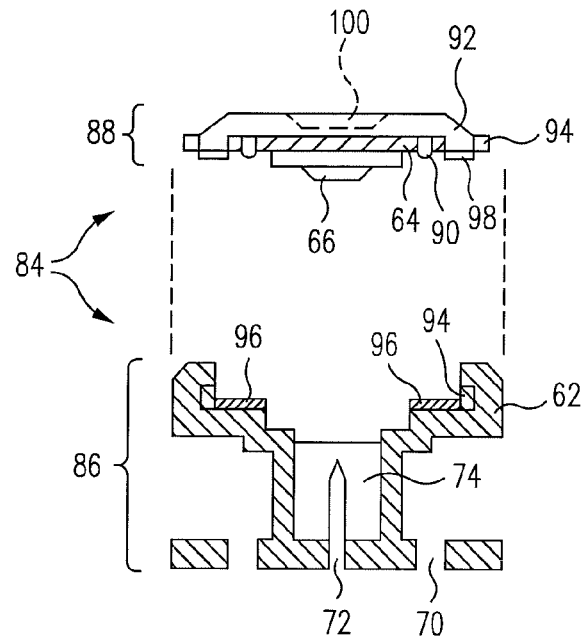
FIG. 14 is an exploded cross-sectional view of the LED panel insert of FIG. 13, as seen along the lines of the section 14-14 taken therein, and showing the associated LED-mounting printed circuit board (PCB) and protective cover thereof.

FIG. 13 is a top plan view of an exemplary embodiment of a two-piece, or multi-part LED or OLED insert 84 for an aircraft ceiling lighting panel, wherein an associated LED-mounting PCB and protective cover assembly 88 thereof is omitted for clarity, and FIG. 14 is an exploded cross-sectional view of the LED panel insert 84 of FIG. 13, as seen along the lines of the section 14-14 taken therein, and showing the associated LED-mounting PCB and protective cover assembly 88 thereof.

As may be seen by reference to FIGS. 13 and 14, the two-part panel insert 84 embodiment is similar to the single-part or integrated insert embodiment 60 above in many respects, except that it is divided into two mechanically separable parts, viz., an insert housing part 86 and an LED-mounting assembly and protective cover part 88. As described below, this arrangement enables an easy replacement of the associated LED 66 in case of a failure thereof. The housing part 86 comprises an opaque housing 62 having adhesive fill openings 70, and may include a trans-parent plug 74 defining a light path opening 72 into which the lens of the associated LED may be inserted, as above. The second part 88 of the insert comprises a PCB 64 mounting a downwardly facing micro LED 66, a pair of spring-loaded electrical contacts 90 respectively coupled to the anode and cathode of the LED 66 through the PCB and protruding downwardly therefrom, a protective cover 92, and engagement features 94 disposed on the protective cover for mechanically coupling and decoupling the second part 88 of the insert to the first part 86, as described below.

In one embodiment, the insert housing 62 is, as above, made of an opaque material, e.g., an injection-molded plastic, and adapted to accept attachment of the LED-PCB and cover assembly 88 at its upper end. The complementary features of the attachment mechanism 94 may comprise, for example, quarter-turn, threaded or snap-in fastener features 94 respectively disposed on the cover 92 and housing 62 of the two insert components. In the particular exemplary embodiment illustrated in FIG. 14, the insert housing 86 also includes conductive pads 96 disposed on an internal shelf at its upper end, similar to those illustrated in FIG. 7 above.

In this configuration, the LED assembly 88 may comprise a PCB 64 incorporating an integrated LED 66 and spring-loaded contacts 90 of a type manufactured by Connect2it, LLC, part number 003-00063. The LED assembly includes retaining fastener features 94 (e.g., snap-in, quarter-turn, threaded, or the like) adapted to interlock with corresponding, complementary fastener features 94 on the insert housing 62 to enable quick assembly and disassembly of the two insert parts. The complementary interlocking features 94 may also be asymmetrical or otherwise keyed in some fashion to prevent inadvertent reverse orientation of the LED assembly 88 relative to the insert housing assembly 86. A compliant seal 98 made of an elastic material, such as silicone rubber, may be used to seal the inner parts of the lens assembly 88 from moisture and dust. A small handle, screw driver slot or other tool- or finger-engagement feature 100 disposed on the back side of the LED assembly 88 may be provided to aid in assembly and disassembly of the two parts.

In the two-piece embodiment 84 of FIGS. 13 and 14, the housing part 86 is first installed in a through-opening of a structural panel (not illustrated), in a manner similar to that of the one-piece insert installation described above in connection with FIGS. 10A and 10B, and conductive traces (not illustrated) are then formed on the upper surface of the panel such that ends of the traces respectively overlap the conductive pads 96 of the housing part 86. The LED and cover assembly 88 is then mechanically coupled to the housing part 86 using the complementary fastener features 94, which causes the spring-loaded electrical contacts 90 of the LED and cover assembly 88 to make contact with and thereby establish electrical contact between the LEDs 66 and the respective traces.

Figure 15:
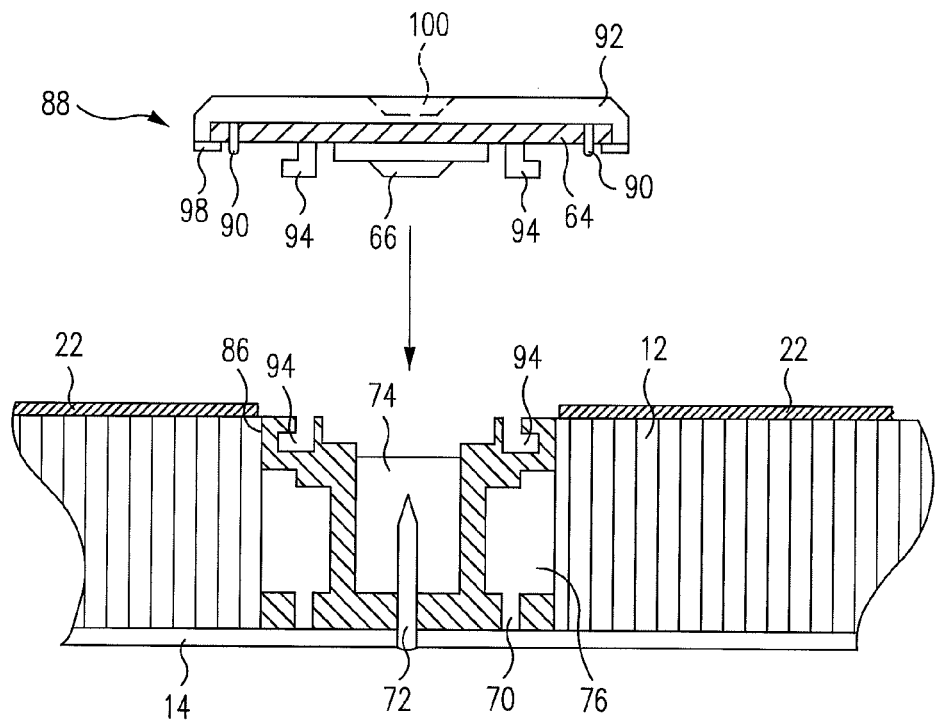
FIG. 15 is a partial cross-sectional view of a vehicle interior lighting panel having an exemplary LED panel insert similar to that of FIGS. 13 and 14 installed therein; and, FIG. 16 is a partial diagrammatic perspective view of an exemplary vehicle interior lighting panel coupling electrical power from an adjacent ceiling wash light assembly by means of a "pigtail" or jumper wire bundle extending between the panel and the wash light.

FIG. 15 is a partial cross-sectional view of an aircraft ceiling panel 12 having a two-piece LED panel insert 84 similar to that of FIGS. 13 and 14 installed therein. However, in this particular embodiment, the protective cover 92 and spring-loaded contacts 90 of the LED and cover assembly 88 extend outboard of the housing part 86 of the insert. Additionally, the conductive traces 22 are printed only up to the edges of the housing part, such that the overlap of the contacts with the ends of the respective trace enables electrical contact to be established between the LED 66 and the trace when the LED and cover part is coupled to the housing part of the insert.

As may be noted, both the one-piece and two-piece panel insert embodiments 60 and 84 described above are illustrated as having a generally cylindrical shape. However, because the angular orientation of the insert relative to the panel 12 is important to effect a proper electrical connection of the associated LED 66 thereof, i.e., in accordance with its operating polarity, it may be desirable, as above, to modify this shape so that it is "keyed" in some way, i.e., made radially asymmetrical, and to provide correspondingly shaped holes or other features in the panel to ensure the correct angular orientation of the inserts when they are installed in the panel. Such precautions will ensure that the installed orientation of the associated micro-LED is in accordance with its desired polarity.

In each of the exemplary embodiments herein, one or more of several direct conductive trace 16 "writing" methods may be used:

1. "Plasma spraying" may be used to deposit a wide range of conductive or non-conductive materials directly onto conformal surfaces. This "direct write" technology is available through, for example, Mesoscribe Technologies of Stony Brook, N.Y.;

2. "Aerosol Spraying" also can also be used to deposit a wide range of materials with extremely fine (4-5 micron) feature size, either on flat substrates or on conformal surfaces. This technology is available through, for example, Optomec, of Albuquerque, N. Mex.;

3. "Ink jet printing" technology, which is available from a wide variety of vendors, may also be used to print to flat substrates, which may then be adhered to conformal surfaces.

As those of skill in the art will appreciate, many aircraft LED lighting systems provide electrical power and a control signal to light fixtures, such as conventional ceiling wash light fixtures 44, of the type illustrated in FIG. 17. Electronics located within the fixture then control the color and brightness of the emitted light. Pulse width modulation is typically used to control the brightness of each LED within the fixture.

Furthermore, each light fixture may be individually controlled. Since the ceiling wash lights are typically disposed in a low-power state while the Starry Sky ceiling panels are on so as to reduce the overall ambient light in the aircraft cabin, the electrical power needed to drive the Starry Sky panels 10 may be drawn from the ceiling wash light assemblies 44 as illustrated in FIG. 17, without the need for additional wiring of the aircraft.

Figure 16:
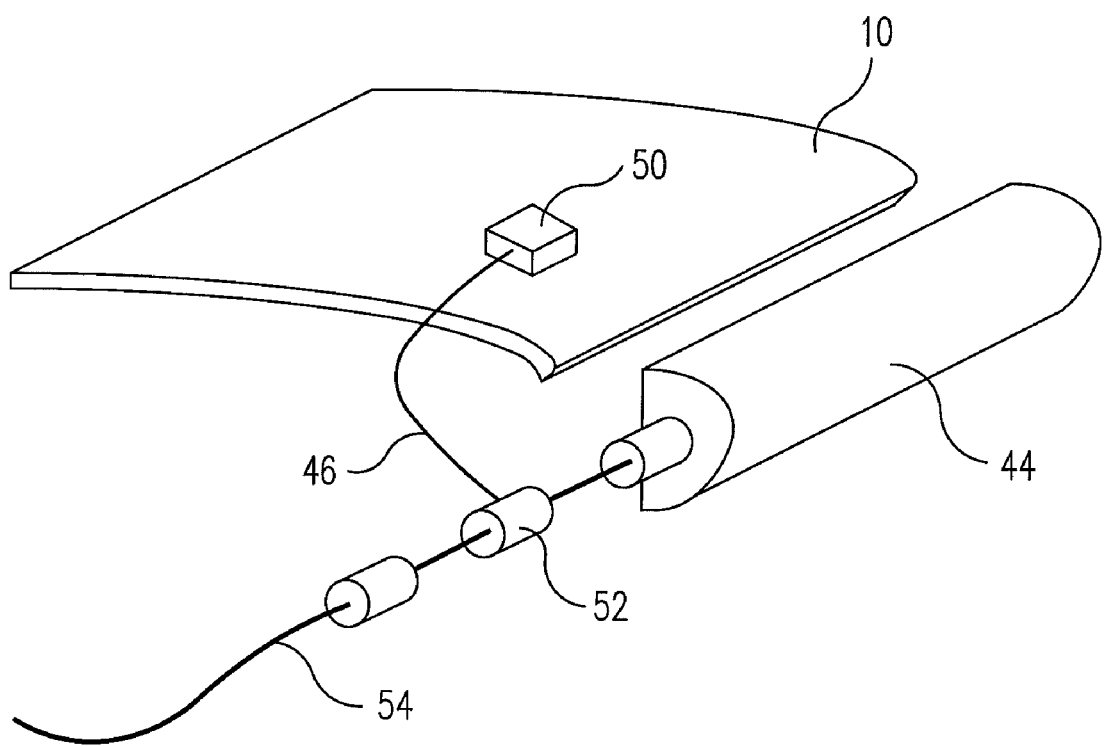

In FIG. 16, a "pigtail" or jumper bundle 46 that conveys electrical power and/or control/brightness settings from the ceiling wash light fixture 44 to a lighting panel control module 50 associated with the panel 10 may have a simple pass-through connector 52 that splices into and couples off power and/or data from the power and/or data line 54 of the existing wash light fixture. As will be appreciated, a ceiling wash light 44 operating in a "night mode" and in combination with an associated Starry Sky panel 10 will require substantially less total power than that which the wash light 44 consumes in other operating modes. Further, the Starry Sky ceiling panel 10 may tap only electrical power (in conjunction with a wireless, i.e., RF, control interface), or alternatively, may tap into both power and lighting control, with the cabin lighting control software being modified to accommodate the control of the Starry Sky lighting panel 10 as well as the existing fixture 44.

In an alternative embodiment, it is also possible (in a suitably configured aircraft) to distribute electrical power and control signals to the Starry Sky ceiling panels 10 through conductive aircraft structure disposed adjacent to the panels or to which they are directly attached.

Control over the Starry Sky lighting panels 10 (typically involving overall star field brightness and blink rate) may be effected, for example, by the following techniques:

1. Transmitting control commands or settings from the aircraft to the panel via a wireless link. In this embodiment, the panels 10 each includes a radio receiver that receives such commands or settings. As discussed above, the radio's antenna may be printed directly on the panel or on a substrate laminated thereto, along with other electrical conductors and components. Several wireless control architectures are feasible, and this option is particularly advantageous for retrofit installations, because it eliminates or substantially reduces the need for re-wiring of the aircraft to accommodate the panels.

2. Transmitting control commands or settings from the airplane to the panel via communication over power line (COPL) technology. In this embodiment, the electronics of the aircraft superimpose the panel 10 control/setting signals over the power signal coupled off to the panel, as described above. A COPL transceiver 50 located on the panel then interprets these signals and controls the light sources of the panel in accordance therewith.

As those of skill in the art will appreciate, the improved Starry Sky lighting panels 10 of the present invention offer a number of advantages over the lighting panels 100 of the prior art. The components of the Starry Sky panels 10 are less expensive (excluding investment in capital equipment). The current manufacturing process has high ergonomic cost factors, including fine detail, repetitive motions, and the like, which are substantially eliminated in the exemplary embodiments disclosed herein.

Additionally, the integration of "direct write" electronics and conductive traces 16 into the Starry Sky panels 10 herein has several additional benefits, including reduced panel weight, shorter process flow times, improved durability, a more efficient form factor and improved ergonomics of manufacture. Indeed, in the past, some aircraft customers have not selected the Starry Sky lighting option because of the weight penalty associated therewith. The novel lighting panels 10 described herein provide a weight savings of about 3 lbs. per panel, which, in an aircraft equipped with about 70 such panels, results in an appreciable weight savings over the prior art panel 100 of FIGS. 1 and 2.

Further, as described above, in some embodiments, the panels may have a "wired" supply of electrical power and a "wireless," e.g., radio, interface for communication and control. Thus, the novel Starry Sky panels require only a low voltage electrical interface for power. Since the panels typically draw very little power to begin with, power can be tapped from existing sources, such as ceiling wash lights, which are typically turned down to low power while the starry sky effect is operating. Tapping power from local sources and providing wireless control greatly simplifies retrofit of existing aircraft by reducing the need to run additional aircraft wiring.

While the various exemplary lighting panel embodiments disclosed herein are described and illustrated in the context of aircraft interior ceiling lighting systems, it will be evident that they are not limited to this particular application, but may be use in a variety of other applications, e.g., other aircraft surfaces, such as entry area ceilings, destination spaces, or even in non-aerospace applications, such as dance halls, restaurants, theaters, trains, buses, residential ceilings, trains, cruise ships and the like.

Indeed, as those of skill in this art will by now appreciate, many modifications, substitutions and variations can be made in the applications, materials, methods and implementations of the Starry Sky lighting panels of the present invention without departing from its spirit and scope. In light of this, the scope of the present invention should not be limited to that of the particular embodiments illustrated and described herein, as they are only by way of some examples thereof, but instead, should be fully commensurate with that of the claims appended hereafter and their functional equivalents.

What is claimed is:

1. A lighting panel, comprising:
    a structural panel having opposite first and second surfaces and a plurality of openings therethrough;
    a plurality of light sources, each having a plurality of leads;
    a plurality of electrically conductive traces directly formed on the first surface of the panel so as to make electrical interconnections with respective leads of each of the light sources;
    a plurality of inserts, each disposed in a respective one of the panel openings and containing a respective one of the light sources, wherein each insert comprises:
        a housing having opposite first and second ends, the first end having an opening adapted to receive the respective light source, the second end having an opening defining a light path of the respective light source, the housing being affixed within the respective panel opening such that the first end is disposed below the first surface of the panel and the second end is disposed generally flush with the second surface thereof; and,
        an assembly affixed to the first end of the housing and composing a PCB having opposite first and second sides, the first side being disposed generally flush with the first surface of the panel and having a first pair of electrically conductive pads disposed thereon, each in electrical connection with a respective end of a first one of the conductive traces,
            wherein the respective light source is mounted on the second side of the PCB and has leads electrically connected to respective ones of the conductive pads through the PCB and a lens directed toward the light path of the housing; and,
        a decorative film disposed over the second surface of the panel, the film being either transparent, translucent, or containing a plurality of apertures therethrough, each corresponding in location to a respective one of the light sources.

2. The lighting panel of claim 1, wherein the decorative film comprises a paint applied to the second surface of the panel.

3. The lighting panel of claim 1, wherein the first side of the PCB includes a second, crossover pair of conductive pads electrically connected to each other through the PCB, each in electrical connection with a respective end of a second one of the conductive traces such that the second trace crosses the first trace without short circuiting therebetween.

4. The lighting panel of claim 1, further comprising:
    a layer of a dielectric material formed over the first side of the PCB so as to cover the first trace and first pair of electrically conductive pads; and,
    a second one of the conductive traces crossing over the dielectric material such that the second trace crosses the first trace without short circuiting therebetween.

5. The lighting panel of claim 1, further comprising a transparent plug disposed between the lens of the light source and an outlet end of the light path and adapted to conduct light produced by the light source to the light path outlet end.

6. The lighting panel of claim 1, wherein each of the inserts and corresponding panel openings includes complementary keying features configured to allow the insert to be installed in the panel at only one angular orientation relative thereto.

7. The lighting panel of claim 1, wherein the respective light source comprises a light emitting diode (LED) or an organic light emitting diode (OLED).

8. The lighting panel of claim 1, wherein the panel comprises a structural ceiling panel of an aircraft.

9. The lighting panel of claim 1, further comprising a transparent gel, fluid, epoxy or silastic material disposed between the lens of the light source and an outlet end of the light path and adapted to conduct light produced by the light source to the light path outlet end.

10. The lighting panel of claim 9, wherein the material is injected into the insert through the light path outlet end after the insert is installed in the panel.

11. The lighting panel of clam 10, further comprising an elongated second lens disposed in the light path of the insert, the second lens having an inner end and an opposite head end extending out through the corresponding aperture of the decorative film.

12. The lighting panel of claim 11, wherein the second lens has at least one selected from the group consisting of:
    an index of refraction similar to that of the respective light source lens;
    a pointed inner end;
    a roughened head end; and,
    a flange disposed around the head end and adapted to engage the decorative film at a margin of the corresponding aperture.

13. A lighting panel, comprising;
    a structural panel having opposite first and second surfaces and a plurality of openings therethrough;
    a plurality of light sources, each having a plurality of leads;
    a plurality of electrically conductive traces directly formed on the first surface of the panel so as to make electrical interconnections with respective leads of each of the light sources;

a plurality of inserts, each disposed in a respective one of the panel openings and containing a respective one of the light sources, wherein each insert comprises:
  a housing having opposite first and second ends, the first end including an opening adapted to receive the respective light source, the second end having an opening defining a light path of the light source, the housing being received and affixed within the respective panel opening such that the first end is disposed generally flush with the first surface of the panel and the second end is disposed generally flush with the second surface thereof; and,
  an assembly affixed to the first end of the housing and comprising a protective cover having opposite first and second sides, the first side having a feature adapted to be engaged by fingers or a tool, the second side having features adapted to engage corresponding complementary features at the first end of the housing in a mechanical coupling engagement;
  a PCB having opposite first and second sides and a first pair of spring-loaded electrical contacts protruding downwardly from the second side thereof, each contact being disposed in electrical contact with a respective end of a first one of the conductive traces; and,
  wherein the light source is mounted on the second side of the PCB and has leads electrically connected to respective ones of the spring-loaded contacts through the PCB and a lens directed toward the light path of the housing; and,
a decorative film disposed over the second surface of the panel, the film being either transparent, translucent, or containing a plurality of apertures therethrough, each corresponding in location to a respective one of the light sources.

14. The lighting panel of claim 13, wherein the first side of the PCB includes a second, crossover pair of downwardly protruding, spring-loaded electrical contacts electrically connected to each other through the PCB, each disposed in electrical contact with a respective end of a second one of the conductive traces such that the second trace crosses the first trace without short circuiting therebetween.

15. The lighting panel of claim 13, further comprising a transparent plug disposed between the lens of the light source and an outlet end of the light path and adapted to conduct light produced by the light source to the light path outlet end.

16. The lighting panel of claim 13, wherein the respective light source comprises a light emitting diode (LED) or an organic light emitting diode (OLED).

17. The lighting panel of claim 13, wherein the panel comprises a structural ceiling panel of an aircraft.

18. The lighting panel of claim 13, wherein each of the inserts and corresponding panel openings includes complementary keying features configured to allow the insert to be installed in the panel at only one angular orientation relative thereto.

19. The lighting panel of claim 13, further comprising a transparent gel, fluid, epoxy or silastic material disposed between the lens of the light source and an outlet end of the light path and adapted to conduct light produced by the light source to the light path outlet end.

20. The lighting panel of claim 19, wherein the material is injected into the insert through the light path outlet end after the insert is installed in the panel.

21. The lighting panel of claim 13, further comprising an elongated second lens disposed in the light path of the insert, the second lens having an inner end and an opposite head end extending out through the corresponding aperture of the decorative film.

22. The lighting panel of claim 21, wherein the second lens has at least one selected from the group consisting of:
  an index of refraction similar to that of the respective light source lens;
  a pointed inner end;
  a roughened head end; and,
  a flange disposed around the head end and adapted to engage the decorative film at a margin of the corresponding aperture.

23. A lighting panel, comprising:
  a structural panel having opposite first and second surfaces and a plurality of openings therethrough;
  a plurality of light sources, each having a plurality of leads;
  a plurality of electrically conductive traces directly formed on the first surface of the panel so as to make electrical interconnections with respective leads of each of the light sources, wherein the electrically conductive traces are formed by a process selected from the group consisting of plasma spraying, aerosol spraying and ink jet printing;
  a plurality of inserts, each disposed in a respective one of the panel openings and containing a respective one of the light sources, wherein each insert comprises:
    a housing having opposite first and second ends, the first end having an opening adapted to receive the respective light source, the second end having an opening defining a light path of the respective light source, the housing being affixed within the respective panel opening such that the first end is disposed below the first surface of the panel and the second end is disposed generally flush with the second surface thereof; and,
    an assembly affixed to the first end of the housing and comprising a PCB having opposite first and second sides, the first side being disposed generally flush with the first surface of the panel and having a first pair of electrically conductive pads disposed thereon, each in electrical connection with a respective end of a first one of the conductive traces,
    wherein the respective light source is mounted on the second side of the PCB and has leads electrically connected to respective ones of the conductive pads through the PCB and a lens directed toward the light path of the housing; and,
  a decorative film disposed over the second surface of the panel, the film being either transparent, translucent, or containing a plurality of apertures therethrough, each corresponding in location to a respective one of the light sources.

* * * * *